July 2, 1940.  J. M. CHRISTMAN  2,206,450
APPARATUS FOR FORMING GEARS
Filed April 10, 1935   2 Sheets-Sheet 2
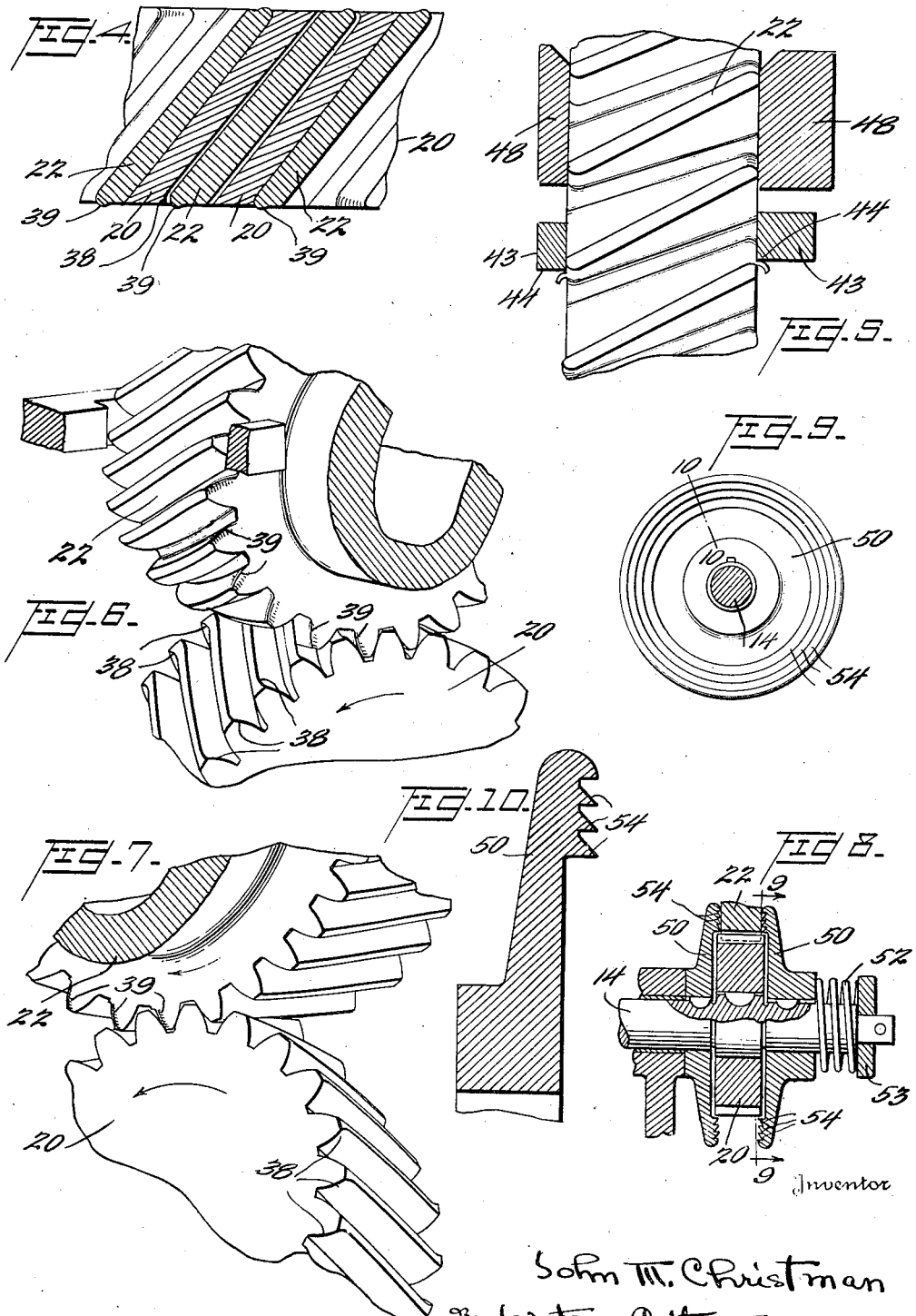

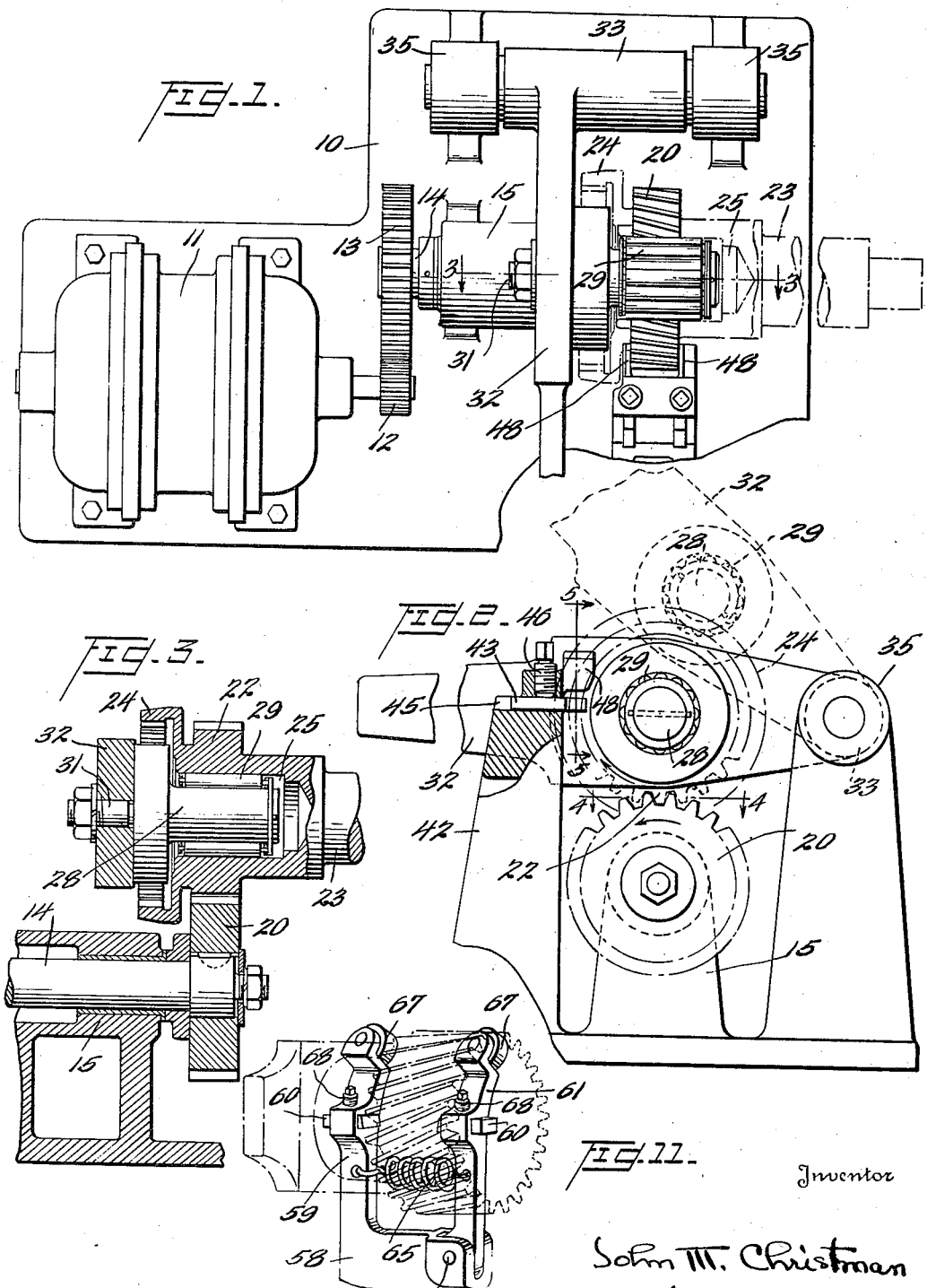

Patented July 2, 1940

2,206,450

UNITED STATES PATENT OFFICE 2,206,450

APPARATUS FOR FORMING GEARS

John M. Christman, Detroit, Mich., assignor to Packard Motor Car Company, Detroit, Mich., a corporation of Michigan Application April 10, 1935, Serial No. 15,652

17 Claims. (Cl. 90—1)

This invention relates to a gear chamfering or burr removing machine and has for its object the provision of a machine of this character which is simple to construct and operate and which will rapidly and efficiently chamfer the edges of gear teeth or remove the burrs formed during manufacture at the intersection of the working surfaces of the teeth with the end faces thereof. The invention also contemplates the provision of a new and improved method of chamfering gear teeth.

This chamfering of gears, commonly done by hand by means of a file, not only serves to prevent the breaking off during use of the gears of small particles of metal, which is obviously highly objectionable in the event the gears are used in an automobile transmission or other closed lubricated housing, but in the case of gears which are axially shiftable into and out of mesh, such as starter gears or gears employed in change speed transmissions, the meshing of the gears is facilitated by the provision of cooperating chamfered or beveled edges.

It has been heretofore proposed to provide machines for effecting the chamfering of gears to replace the hand chamfering commonly employed, but these machines rely for the most part on a cutting operation which is difficult to execute with accuracy and which is likely to leave burrs or rough edges on the teeth which are equally as objectionable as the original burrs on the freshly cut gear teeth. It is proposed by the present invention to eliminate these difficulties and to effect chamfering of the teeth by deformation of each tooth by the application of pressure thereto before the gear is hardened. If desired, the material displaced as the result of such deformation may be removed by grinding or cutting, but under some circumstances this step may be eliminated.

It is accordingly a further object of the invention to provide apparatus for forming chamfered gear teeth by the performance of the method indicated, the apparatus being simple and inexpensive to construct and operate.

In a more specific aspect thereof, the invention contemplates the rolling of an unhardened gear to be chamfered with a hardened toothed element, the latter having the end portions of the teeth thereof deformed, whereby corresponding deformation of the end portions of the teeth of the unhardened gear may be effected to provide the desired chamfer. Apparatus for carrying out this method preferably includes cutting means disposed adjacent the chamfered ends of the teeth for removing excess metal as it is displaced from the body of the tooth.

Further objects and features of the invention will be apparent from the following description taken in connection with the accompanying drawings, in which Figure 1 is a plan view of one form of apparatus for chamfering gears in accordance with the invention;

Figure 2 is an end elevation, partly in section, of the apparatus shown in Figure 1;

Figure 3 is a vertical section taken substantially on the line 3—3 of Figure 1;

Figure 4 is a horizontal sectional view on the line 4—4 of Figure 2;

Figure 5 is a section taken substantially on the line 5—5 of Figure 2;

Figures 6 and 7 are perspective views illustrating the manner in which the hardened toothed element and unhardened gear cooperate to chamfer the latter;

Figure 8 is a sectional view illustrating a modified arrangement for removing displaced material from the gear teeth;

Figure 9 is a section on the line 9—9 of Figure 8;

Figure 10 is a section on the line 10—10 of Figure 9; and

Figure 11 is a perspective view illustrating a further modified form of the device for removing displaced material from the gear teeth.

For convenience in describing the invention, reference is made to the several embodiments thereof illustrated in the accompanying drawings and specific language is employed. It will nevertheless be understood that no limitation of the scope of the invention is thereby intended but that various further modifications and alterations are contemplated such as would occur to one skilled in the art to which the invention relates.

Referring first to Figures 1 to 3 of the drawings which illustrate a simple apparatus for chamfering gears in accordance with the method outlined herein, it will be observed that a base 10 serves to support a motor 11, the latter serving to rotate, by means of intermeshing gears 12 and 13, a shaft 14 which is journalled in a bearing boss 15 rising from the base 10. Keyed or otherwise secured to one end of the shaft 14 is a toothed element 20, the teeth of which are arranged to mesh with the teeth of a gear 22 to be chamfered. The gear 22 illustrated in the drawings is the end gear of a change speed transmission shaft 23, a clutch member 24 being formed on one end of the gear 22. It will be appreciated, however, that these details form no essential part of the present invention, the apparatus disclosed herein being capable of use with little or no modification in the processing of any gear, whether formed singly or in a cluster.

The gear 22 is formed to provide a cylindrical recessed portion 25 for the reception of an aligned shaft in the assembled transmission mechanism in which the gear 22 is employed, and use is made of this recessed portion to support the gear 22 in meshing relation with the toothed element 20. Thus a spindle 28 carrying an anti-friction bearing 29 may be received within the gear 22, the spindle 28 being secured, for instance by means of a bolt 31, to an arm 32, the arm 32 being provided with a hub portion 33 which may be journalled for rotation about an axis substantially parallel with the axes of the gear 22 and toothed element 20 by means of bearing bushings 35 carried by or formed integrally with the base 10.

To facilitate an understanding of the construction, the gear 22 is not shown in position on the bearing 29 in Figure 1 of the drawings. It will be appreciated, however, that when the arm 32 is swung upwardly about its axis of pivotal support, the gear 32 may be slipped over the bearing 29, and the arm depressed to place the gear in meshing relation with the toothed element 20 as shown in Figure 3. Any desired amount of pressure may be manually applied to the arm 32 to maintain this meshing engagement, and when the motor 11 is operated, both the toothed element 20 and the gear 22 will be rotated, the element 20 driving the gear. Alternatively, the gear 22 may be mounted on the shaft 14 and employed to drive the element 20.

The shape of the teeth on the element 20 is illustrated more particularly in Figures 4 to 7 of the drawings, and preferably conforms substantially to the shape of the teeth on the gear 22, so that the gear and element may be rotated in meshing relation with the working surfaces of the cooperating teeth partaking of substantially rolling engagement as in the case of any pair of well-designed cooperating gears. It will be observed, however, that the working faces of the teeth of the element 20 are deformed at points opposite the ends of the opposed working faces of the teeth of the gear 22 to provide generally radical protuberances 38 at one side only of each end of the tooth of the element. The element 20 is hardened by any suitable process, whereas the gear 22, or at least the toothed portion thereof, is relatively soft, the operation described herein being preferably carried out on the gear 22 after the cutting of teeth on the blank from which the gear is formed and prior to any hardening operation. Thus the protuberances 38 on the teeth of the hardened element 20 will apply pressure to and will deform the opposed portions of the working faces of the teeth of the relatively soft gear 22 as the gear and element are rolled together in meshed relation. The result of this deformation of the working faces of the teeth of the gear 22, as illustrated clearly in Figure 4 of the drawings, is to flatten the edge or arris formed by the intersection of the working faces and the ends of the gear teeth. Thus the ends of the gear teeth are in effect chamfered, the material of which the gear teeth are formed being displaced laterally or swaged over with the resultant formation of projections 39 at the ends of the gear teeth.

The protuberances 38 on the teeth of the element 20 are preferably formed by providing a gradual curve in the working face of the teeth, whereby the end edges of the opposed teeth of the gear 22 are rounded. Nevertheless the operation on the gear teeth is essentially one of flattening the end edges, it being appreciated that the rounded contour of the ends of the gear teeth upon completion of the operation is substantially flatter than is the initial sharply angled edge or arris formed by the cutting of the teeth in the blank. Obviously the protuberances 38 may be of different shape than that shown in the drawings, the relatively soft teeth of the gear 22 being swaged to the corresponding shape by the rolling operation.

Figures 6 and 7 illustrate the swaging of gear teeth of different contour, and it will be noted that in general it is preferred that the main portions of the teeth of the hardened element 20 shall have working faces of such contour as to correspond generally with the teeth of a gear designed for proper driving relation with the teeth of the gear 22, so that substantially no deformation of the main portions of the working faces of the teeth 22 results from the swaging operation. Whether protuberances 38 are formed at both ends of each working face of the teeth of the element 20 will obviously depend on whether chamfering of both end edges of the opposed working faces of the teeth of the gear 22 is required. Thus in the processing of gears having spiral or twisted teeth, such as are illustrated in the drawings, it is ordinarily necessary to chamfer only the end edges formed by the intersection of working faces and end faces having an acute angular relation.

Thus it is found that these acute angled edges are more likely to be formed with an initial burr by the cutting of the teeth and are much more subject to fracture in operation than are the obtuse angled edges, and it is essential, particularly in the processing of gears for use in closed lubrication systems such as are employed in the change speed gearing of automobiles, that the braking off of fragments of the teeth and the wearing away of any burrs formed during cutting be avoided.

In a swaging operation such as that hereinbefore described, it is frequently desirable to remove the material displaced laterally of the teeth and forming the projections 39, particularly since these projections constitute burrs in themselves which are likely to chip off and act as an abrasive, resulting in excessive wear of the cooperating working surfaces of the teeth in the assembled gear train. For this purpose an arrangement such as shown in Figures 1 to 3, and 5 of the drawings may be employed, the excess metal being preferably removed by a cutting operation.

Thus a stationary cutting device may be supported on a standard 42 rising from the base 10 of the machine, this cutting device including a pair of cutting tools 43, these tools having cutting edges 44 which are disposed at opposite sides of the gear 22 when the latter is properly meshed with the gear element 20. Each of the tools 43 may be received in a guideway 45 formed in the standard 42 for sliding movement toward and away from the gear 20, being retained in any position of adjustment by a set screw 46. Guide members 48 may project from the standard 42 toward the gear 22 to embrace the latter, each guide member 48 being arranged for engagement with the adjacent end face of the gear. By means of this construction the gear 22, when moved into meshing relation with the element 20, may be maintained against axial displacement so that the swaging and cutting operations will be properly performed. It will be observed from the direction of the arrows in Figure 2 that the teeth of the gear 22 are first swaged with the resultant formation of the upset portions or projections 39 on the ends of the teeth, these projections thereafter passing the cutting tools 44 and being thereby removed, the guide members 48 engaging the flat end faces of the gears which result from the cutting operation.

In Figures 8 to 10 inclusive of the drawings a different type of cutting mechanism for removing the projections 39 from the teeth of the gear 22 is disclosed. Thus generally circular cutting tools 50 may be mounted on the shaft 14 on either side of the hardened toothed element 20, these cutting tools being supported for rotation with the shaft 14. Preferably the element 20 and the cutting tools 50 are permitted some slight axial movement on the shaft 14, and a coil spring 52 is interposed between a collar 53 on the end of the shaft 14 and the adjacent cutting tool 50, whereby both cutting tools are urged into engagement with the end faces of the toothed element 20 and gear 22. The necessary light cutting pressure will obviously be applied to the tools 50 by the spring 52 even though gears varying in width to a considerable extent are treated and the cutting may be carried out to any desired depth.

Each of the cutting tools may be provided with cutting surfaces, for instance in the form of annular ribs 54 as shown more particularly in Figures 9 and 10, these ribs engaging the end faces of the gear 22. Thus as the teeth of the gear 22 are successively swaged over by engagement with the toothed element 20, and as they pass out of such engagement, the projections 39 which are formed on the teeth will pass successively across the cutting ribs 54 so that a substantial part or the whole of the projections 39 is removed and any burr on the end faces of the teeth of the gear 22 is eliminated. The cutting pressure is of course supplied in this form of the invention by the spring 52, this spring permitting the cutting of gears of varying width.

In Figure 11 of the drawings a further modified form of cutting mechanism is illustrated, this mechanism being supported on a member 58 rising from the base 10 of the machine. An upwardly directed arm 59, which may be formed integrally with the member 58, serves as a support for one of the cutting tools 60, the other cutting tool being carried in an upwardly directed arm 61 which is pivoted at 62 to the member 58 and which is urged toward the arm 59 by means of a coil spring 65 which acts under the tension between the two arms. The extent to which the arm 61 may be moved toward the arm 59 is determined by the engagement of the rollers 67 with the end faces of the gear 22, these rollers being mounted in the arms 59 and 61 respectively. The cutting tools 60 are adjustable toward and away from the ends of the teeth of the gear 22, being retained in adjusted position by means of set screws 68.

While it is of course essential that the chamfering or swaging operation described herein be performed while the teeth of the gear being processed are unhardened, it is preferred to practice the invention by the execution of the several steps in the formation of the gear in the following manner. The teeth of the gear are first formed on a blank by a rough cutting operation, the gear being then carburized, quenched, and annealed. The chamfering operation is now carried out and when completed the gear is subjected to a finishing cutting operation or a burnishing process to form the working surfaces of the teeth to the precise contour desired, after which the gear is hardened by any conventional method.

It will be apparent from the foregoing description that the invention contemplates the flattening or, chamfering of gear teeth by a method which is extremely simple to perform and which can be carried out by the use of inexpensive and easily operated mechanism. Since only a relatively few revolutions of the gear and cooperating toothed element are required to complete the swaging, the process is extremely rapid, particularly when compared with hand filing methods which are in common use even at the present time. In the event a very decided chamfer is required on the ends of the gear teeth, for instance to facilitate the meshing of axially slidable gears, pressure may be gradually applied to effect meshing of the gear and the hardened toothed element, the cooperating teeth moving into deeper engagement as the swaging of the gear teeth progresses. In any event, the gear and the hardened element are supported against relative axial displacement, the operation being effected by relative radial displacement of the gear and element.

Having thus described the invention, what is claimed as new and desired to be secured by Letters Patent is:

1. In apparatus for chamfering the ends of gear teeth, the combination with means for supporting a gear to be chamfered for rotation on the axis thereof, of a hardened element having teeth thereon arranged to mesh with the teeth of said gear, means supporting said element for rotation on the axis thereof and in axially fixed intermeshing relation with said gear, the working faces of the teeth of said element being deformed at points opposed to the working faces of the gear teeth adjacent the ends of the latter to apply pressure to the gear teeth to deform the end edges thereof when the gear and element are rotated together, and means for imparting rotation to said gear and element.

2. In apparatus for chamfering the ends of gear teeth, the combination with means for supporting a gear to be chamfered for rotation on the axis thereof, of a hardened element having teeth thereon arranged to mesh with the teeth of said gear, means supporting said element for rotation on the axis thereof and in axially fixed intermeshing relation with said gear, the working faces of the teeth of said element being deformed at points opposed to the working faces of the gear teeth adjacent the ends of the latter to apply pressure to the gear teeth to deform the end edges thereof when the gear and element are rotated together, means for imparting rotation to said gear and element, and means for removing material from the ends of the gear teeth after deformation of the teeth.

3. In apparatus for chamfering the ends of gear teeth, the combination with means for supporting a gear to be chamfered for rotation on the axis thereof, of a hardened element having teeth thereon arranged to mesh with the teeth of said gear, means supporting said element for rotation on the axis thereof and in axially fixed intermeshing relation with said gear, the working faces of the teeth of said element being deformed at points opposed to the working faces of the gear teeth adjacent the ends of the latter to apply pressure to the gear teeth to deform the end edges thereof when the gear and element are rotated together, means for imparting rotation to said gear and element, and means for removing material from the ends of the gear teeth after deformation of the teeth, said last named means comprising a cutting device supported adjacent said gear for engagement therewith during rotation of said gear and element in intermeshing relation.

4. In apparatus for chamfering the ends of gear teeth, the combination with means for supporting a gear to be chamfered for rotation on the axis thereof, of a hardened element having teeth thereon arranged to mesh with the teeth of said gear, means supporting said element for rotation on the axis thereof and in axially fixed intermeshing relation with said gear, the working faces of said element having portions formed for substantially rolling engagement with the working faces of said gear and having portions directed toward the cooperating working faces of the gear teeth adjacent the ends of the latter, whereby pressure may be applied to the working faces of the gear teeth to deform the latter and flatten the end edges thereof, and means for rotating said gear and element in intermeshing relation.

5. In apparatus for chamfering the ends of gear teeth, the combination with means for supporting a gear to be chamfered for rotation on the axis thereof, of a hardened element having teeth thereon arranged to mesh with the teeth of said gear, means supporting said element for rotation on the axis thereof and in axially fixed intermeshing relation with said gear, the working faces of said element having portions formed for substantially rolling engagement with the working faces of said gear and having portions directed toward the cooperating working faces of the gear teeth adjacent the ends of the latter, whereby pressure may be applied to the working faces of the gear teeth to deform the latter and flatten the end edges thereof, means for rotating said gear and element in intermeshing relation, and means for removing the burr formed at the ends of the gear teeth by deformation of the latter.

6. In apparatus for chamfering the ends of gear teeth, the combination with means for supporting a gear to be chamfered for rotation on the axis thereof, of a hardened element having teeth thereon arranged to mesh with the teeth of said gear, means supporting said element for rotation on the axis thereof and in intermeshing relation with said gear, the working faces of said element having portions formed for substantially rolling engagement with the working faces of said gear and having portions directed toward the cooperating working faces of the gear teeth adjacent the ends of the latter, whereby pressure may be applied to the working faces of the gear teeth to deform the latter and flatten the end edges thereof, means for rotating said gear and element in intermeshing relation, and means for removing the burr formed at the ends of the gear teeth by deformation of the latter, said last named means comprising a cutting device operatively connected with said element for rotation therewith.

7. In apparatus for chamfering the ends of gear teeth, the combination with means for supporting a gear to be chamfered for rotation on the axis thereof, of a hardened element having teeth thereon arranged to mesh with the teeth of said gear, means supporting said element for rotation on the axis thereof and in intermeshing relation with said gear, the working faces of said element having portions formed for substantially rolling engagement with the working faces of said gear and having portions directed toward the cooperating working faces of the gear teeth adjacent the ends of the latter, whereby pressure may be applied to the working faces of the gear teeth to deform the latter and flatten the end edges thereof, means for rotating said gear and element in intermeshing relation, means for removing the burr formed at the ends of the gear teeth by deformation of the latter, said last named means comprising a cutting device supported adjacent said gear, and guiding means for said cutting device engaging the ends of undeformed gear teeth for regulating the depth of cut effected by said device.

8. As an article of manufacture, an element for effecting deformation and flattening of the end edges of the teeth of an unhardened gear, said element having teeth constructed for meshing relation with the gear, the working faces of the teeth of said element being distorted adjacent one end thereof to provide generally radially extending protuberances at one side only of such tooth end for applying pressure to the gear teeth in a direction generally normal to the working faces of the latter when the element is rolled with the gear.

9. In apparatus for removing the burr formed by a chamfering operation at the end edges of the teeth of a toothed blank, the combination with a support on which the blank is rotatably mounted, of a toothed element rotatably supported for meshing relation with said blank, and means movable with said toothed element and engaging the burred portion of the teeth of said blank to remove the burr.

10. In apparatus for removing the burr formed by a chamfering operation at the end edges of the teeth of a toothed blank, the combination with a support on which the blank is rotatably mounted, of a toothed element rotatably supported for meshing relation with said blank, and means movable with said toothed element and engaging the burred portion of the teeth of said blank to remove the burr, said means including a member having cutting teeth thereon, and yieldable means urging said member into engagement with said blank.

11. In apparatus for removing the burr formed by a chamfering operation at the end edges of the teeth of a toothed blank, the combination with a support on which the blank is rotatably mounted, of a toothed element rotatably supported for meshing relation with said blank, means movable with said toothed element and engaging the burred portion of the teeth of said blank to remove the burr, and yieldable means urging said member into engagement with said blank, said burr-removing means including a member formed to provide a series of annular cutting teeth for engagement with said blank.

12. In apparatus for removing the burr formed by a chamfering operation at the end edges of the teeth of a toothed blank, the combination with a support on which the blank is rotatably mounted, of a toothed element rotatably supported for meshing relation with said blank, means movable with said toothed element and engaging the burred portion of the teeth of said blank to remove the burr, said means including a pair of burr cutting elements positioned for simultaneous engagement with the opposite ends of the blank teeth, and yielding means urging said elements into engagement with said blank teeth.

13. In apparatus for removing the burr formed by a chamfering operation at the end edges of the teeth of a toothed blank, the combination with a support on which the blank is rotatably mounted, of means supported for rotation in engagement with the burred portion of the blank teeth for removing the burr, and means supported in meshing relation with the teeth of said blank having a rotative connection with said last named means.

14. In apparatus for removing the burr formed by a chamfering operation at the end edges of the teeth of a toothed blank, the combination with a support on which the blank is rotatably mounted, of means supported for rotation in engagement with the burred portion of the blank teeth for removing the burr, means supported in meshing relation with the teeth of said blank having a rotative connection with said last named means, and yielding means urging said first named means into blank engaging position.

15. In apparatus for removing the burr formed by a chamfering operation at the end edges of the teeth of a toothed blank, the combination with a support on which the blank is rotatably mounted, of rotatable cutting means movably supported adjacent said blank, means yieldably urging said cutting means into engagement with the burred portion of the blank teeth, and means limiting movement of said cutting means toward said blank to regulate the depth of the cut effected thereby.

16. In apparatus for removing the burr formed by a chamfering operation at the end edges of the teeth of a toothed blank, the combination with a support on which the blank is rotatably mounted, of rotatable cutting means movably supported adjacent said blank, means yieldably urging said cutting means into engagement with the burred portion of the blank teeth, and means limiting movement of said cutting means toward said blank to regulate the depth of the cut effected thereby, said last named means being movable with said cutting means and engaging a portion of the blank other than the burred portion.

17. As an article of manufacture, an element for effecting deformation and flattening of the end edges of the teeth of an unhardened gear, said element having teeth constructed for meshing relation with the gear, the working faces of the teeth of said element being distorted adjacent one end thereof to provide generally radially extending protuberances for applying pressure to the gear teeth in a direction generally normal to the working faces of the latter when the element is rolled with the gear, the tooth spaces of said element being open laterally at such end.

JOHN M. CHRISTMAN.